United States Patent [19]

Lindner

[11] Patent Number: 4,641,695
[45] Date of Patent: Feb. 10, 1987

[54] TREAD FOR A PNEUMATIC TIRE

[75] Inventor: Daniel J. Lindner, Canal Fulton, Ohio

[73] Assignee: The Goodyear Tire & Rubber Company, Akron, Ohio

[21] Appl. No.: 776,548

[22] Filed: Sep. 16, 1985

Related U.S. Application Data

[63] Continuation-in-part of Ser. No. 632,089, Jul. 18, 1984, abandoned.

[51] Int. Cl.⁴ .............................................. B60C 11/06
[52] U.S. Cl. .............................. 152/209 A; 152/209 R
[58] Field of Search .......... 152/209 R, 209 A, 209 D; D12/142, 144, 145

[56] References Cited

U.S. PATENT DOCUMENTS

| D. 50,673 | 5/1917 | Adams . | |
|---|---|---|---|
| D. 55,302 | 5/1920 | Novak . | |
| D. 112,978 | 7/1938 | James . | |
| D. 208,134 | 7/1967 | Pedroso . | |
| D. 250,886 | 1/1979 | Voegler . | |
| D. 250,887 | 1/1979 | Poque . | |
| D. 250,947 | 1/1979 | Poque . | |
| D. 269,337 | 6/1983 | Maeda et al. . | |
| 3,674,077 | 7/1972 | Verdier | 152/209 R |
| 3,705,613 | 12/1972 | Verdier | 152/209 R |
| 4,057,089 | 11/1977 | Johannsen | 152/209 R |
| 4,166,490 | 9/1979 | Poque | 152/209 R |
| 4,223,712 | 9/1980 | Iwata et al. | 152/209 D |
| 4,351,381 | 9/1982 | Roberts et al. | 152/209 R |
| 4,424,843 | 1/1984 | Fontaine et al. | 152/209 R |
| 4,424,844 | 1/1984 | Fontaine | 152/209 R |
| 4,545,415 | 10/1985 | Lindner | 152/209 R |
| 4,574,856 | 3/1986 | Grass | 152/209 R |

OTHER PUBLICATIONS

1980 Tread Design Guide, p. 77, Semperit M301 Speed Radial VTT, bottom left corner of page.

Primary Examiner—Michael Ball
Attorney, Agent, or Firm—L. R. Drayer

[57] ABSTRACT

A tread portion for a pneumatic tire is divided axially across its width into three zones. A pair of lateral edge portions cooperate to provide a directional tread pattern, while a central portion of the tread has a non-directional tread pattern.

16 Claims, 10 Drawing Figures

TREAD FOR A PNEUMATIC TIRE

This is a Continuation in Part of application Ser. No. 632,089 filed July 18, 1984, now abandoned.

BACKGROUND OF THE INVENTION

The present invention relates generally to pneumatic tires, and more particularly to the tread portion of a pneumatic tire wherein said tread portion is asymmetric with respect to the mid-circumferential plane of the tire.

It is generally recognized in the tire art that a tire with a directional tread design has lower noise generation characteristics, when rotated in the direction that it is designed to rotate in, than a tire having a non-directional tread design. As used herein a "directional tread design" is a tread structure that is intended to operate more efficiently when rotated in one direction than in the opposite direction, and a "non-directional tread design" is a tread structure that is intended to operate with equal efficiency regardless of the direction in which it is rotated.

The present invention provides a tire having an asymmetric tread structure with lateral edge portions that are directional and a central portion that is non-directional.

A pneumatic tire having a tread according to the preferred and most preferred embodiments of the present invention may be referred to as an all season tire. An "all season tire" is a tire with a tread portion adapted to provide good wet and snow traction while still maintaining good dry traction, tread wear, noise levels and handling. It is understood that in order to provide these desirable characteristics for an all season tire it is necessary to compromise the levels of some characteristics because, for example, a tread portion that provides a very good level of wet traction or snow traction performance generally has poorer dry traction, handling and/or noise levels.

A pneumatic tire having a tread portion according to either the preferred or most preferred embodiment of the present invention is suitable for use in all seasons of the year and provides good wet and snow traction while still maintaining good dry traction, tread wear, noise levels, and handling.

DETAILED DESCRIPTION OF THE INVENTION

Figure 1:
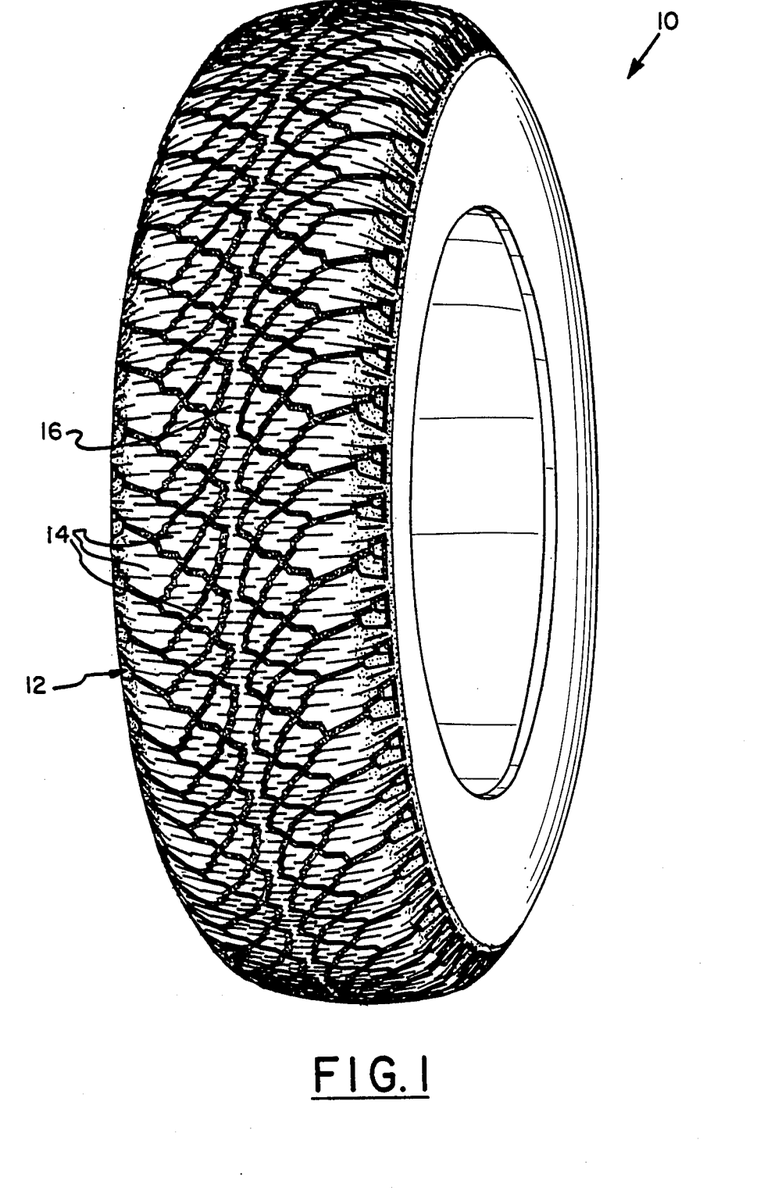
FIG. 1 is a perspective view of a pneumatic tire having a tread portion made in accordance with the most preferred embodiment of the present invention.
Figure 2:
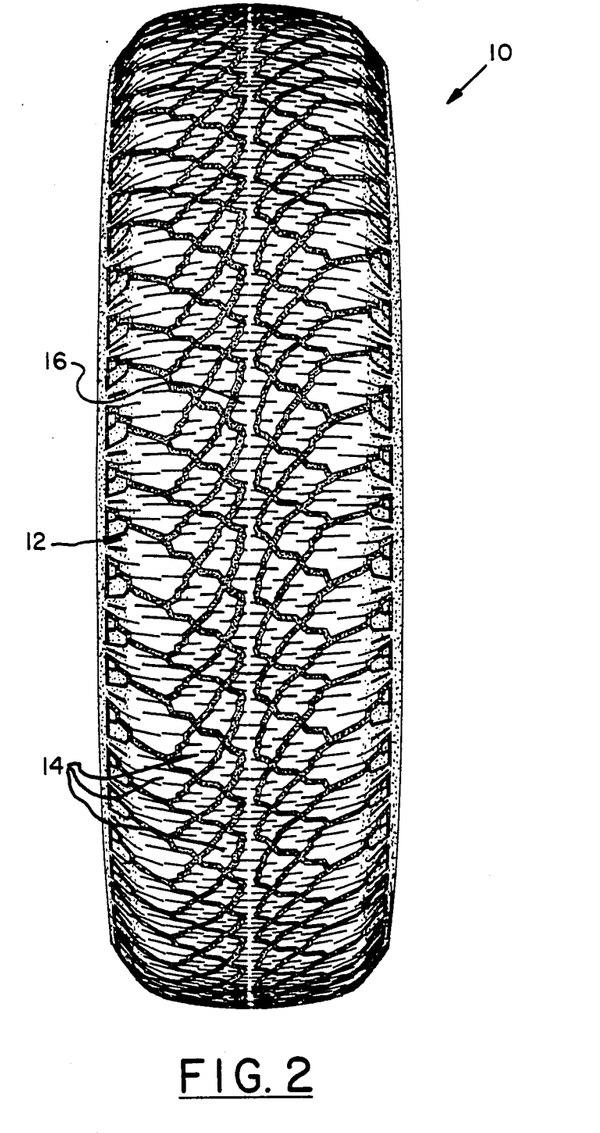
FIG. 2 is a front elevation view of the tire of FIG. 1.
Figure 3:
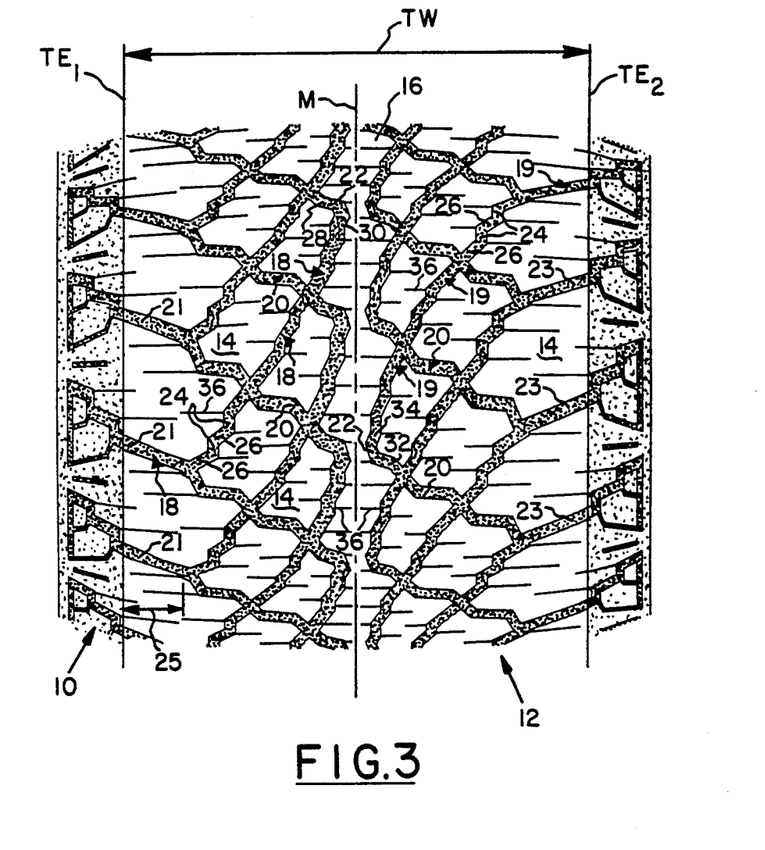
FIG. 3 is a fragmentary plan view of the tread portion of a tire of FIG. 1.
Figure 4:
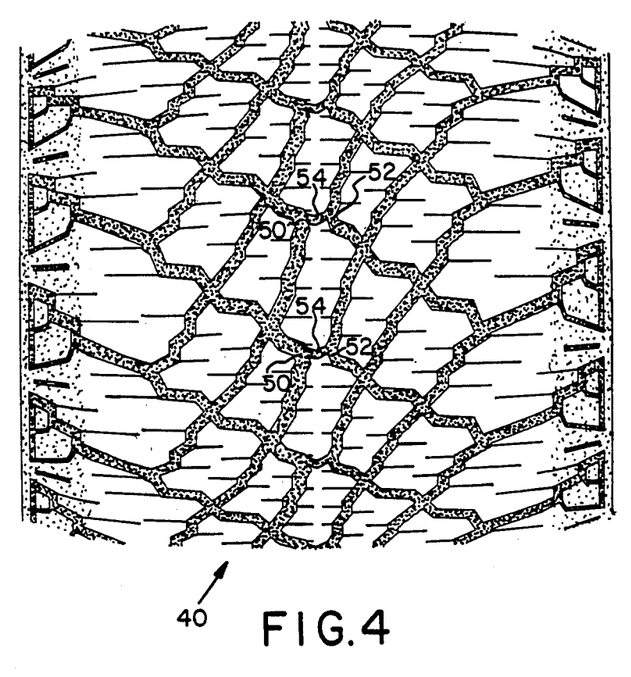
FIG. 4 is a fragmentary plan view of the tread portion of a pneumatic tire in accordance with a preferred embodiment of the present invention, but not having a continuous center rib.

Referring to the drawing, there is illustrated in FIG. 1 a perspective view of a pneumatic tire 10 having a tread portion 12 manufactured in accordance with the most preferred embodiment of the present invention. FIG. 2 is a front elevation view of the pneumatic tire 10 of FIG. 1, and FIG. 3 is a fragmentary plan view of the tread portion 12 of the pneumatic tire 10 of FIGS. 1 and 2. The invention may be most advantageously practiced if the pneumatic tire is a radial tire intended for use on a passenger car, but the invention also applies to truck and bus tires. It is understood that the tread portion extends circumferentially about the tire and comprises a plurality of independent projections or buttons 14, and in the most preferred embodiment a continuous rib 16 that extends circumferentially about the tread portion and contains the mid-circumferential plane of the tire. In an alternative preferred embodiment of the invention, as illustrated in FIG. 4, the continuous rib 16 is replaced by a circumferentially extending series of independent projections or buttons. For the purposes of this invention, an independent projection or button shall be understood to mean a projection which has a circumferential length and an axial width that are each substantially less than one-half the width of the footprint of the tire. For the purposes of this invention, a rib is continuous if it is without any axial breaks, that is, without any notches, slits, blading or other features which extend continuously axially across the rib.

However, before going into the details of the preferred and most preferred embodiments of the invention, the basic structure of the invention may best be explained with reference to FIG. 5 which is a fragmentary plan view of the tread portion 60 of a pneumatic tire in accordance with an alternate embodiment of the invention.

In the alternate embodiment the shape of the independent projections 61 and the continuous rib 62 are defined by a number of grooves in the tread portion. The system of grooves comprise a first set of primary grooves 63, a second set of primary grooves 64, and first and second sets of secondary grooves 65.

Each of the primary grooves 63,64 comprises two sections having widths such that the primary grooves remain open in a footprint of the tire. While the sections shown in FIG. 5 are straight, it is understood that the sections can be curvilinear and still be within the scope of the present invention. It is understood that as used herein a footprint, and of course a tread of a tire, is evaluated when a tire is mounted upon the specified rim, inflated to its specified inflation pressure and then subjected to its rated load. Each groove 63 of the first set of primary grooves extends generally axially inwardly from a first axial edge $TE_1$ of the tread, but does not intersect the mid-circumferential plane M of the tire. Each groove 64 of the second set of primary grooves extends generally axially inwardly from a second axial edge $TE_2$ of the tread, but does not intersect the mid-circumferential plane M of the tire. As used herein, "generally axially" refers to a direction that is not parallel to the axis of rotation of a tire, but is a direction going away from a tread edge which will eventually intersect the mid-circumferential plane of the tire, or vice-versa. Preferably the circumferential spacing between primary grooves at the respective axial edge of the tread is in the range of 20 to 40 mm, or put another way about 20 to 40% of the tread width. As used herein the tread width TW is the axial distance between the axial edges of the tread $TE_1$ and $TE_2$ as measured from the footprint of a tire. As used herein "axial" and "axially" refer to directions that are parallel to the axis of rotation of a tire, and the "mid-circumferential plane" of a tire is a plane that is perpendicular to a tire's axis of rotation and is equidistant from the axial edges of the tread in a tire's footprint.

Each primary groove 63,64 has an axially inner end 66 that is located an axial distance of not more than 15% of the tread width TW away from the mid-circumferential plane M of the tire. Preferably, the axially inner end of each primary groove is located an axial distance of between 3% to 12% of the tread width away from the mid-circumferential plane of the tire.

The axially outermost section 67 of each of the grooves 63 of the first set of primary grooves extends axially inwardly from the first axial edge $TE_1$ of the tread in one generally circumferential direction of the tire at an angle in the range of 50° to 80°, preferably 70° to 80°, with respect to the mid-circumferential plane M. The second section 68 of each of the grooves 63 of the first set of primary grooves extends from the axially inner end of said axially outermost section 67 to the axially inner end 66 of the primary groove in an opposite generally circumferential direction of the tire at an angle in the range of 10° to 30°, preferably 12° to 25°, with respect to the mid-circumferential plane M. As used herein a circumferential direction is a direction in which the tire rotates about its axis, and a "generally circumferential direction" means a direction that would eventually go completely around the axis of rotation but also extends axially with respect to the tire.

Each groove 64 of the second set of primary grooves extends from the second axial edge of the tread $TE_2$ to the axially inner end 66 of the groove in only one generally circumferential direction along its entire length. That is to say, the axially outermost section 69 of each of the grooves 64 of the second set of primary grooves extends axially inwardly from the second axial edge of the tread $TE_2$ at an angle in the range of 50° to 80°, preferably 70° to 80°, with respect to the mid-circumferential plane, and the second section 70 extends axially inwardly from the axially inner end of said axially outermost section 69 to the axially inner end 66 the of primary groove in the same generally circumferential direction as the axially outermost section 69 but at an angle in the range of 10° to 30°, preferably 12° to 25°, with respect to the mid-circumferential plane.

Figure 5:
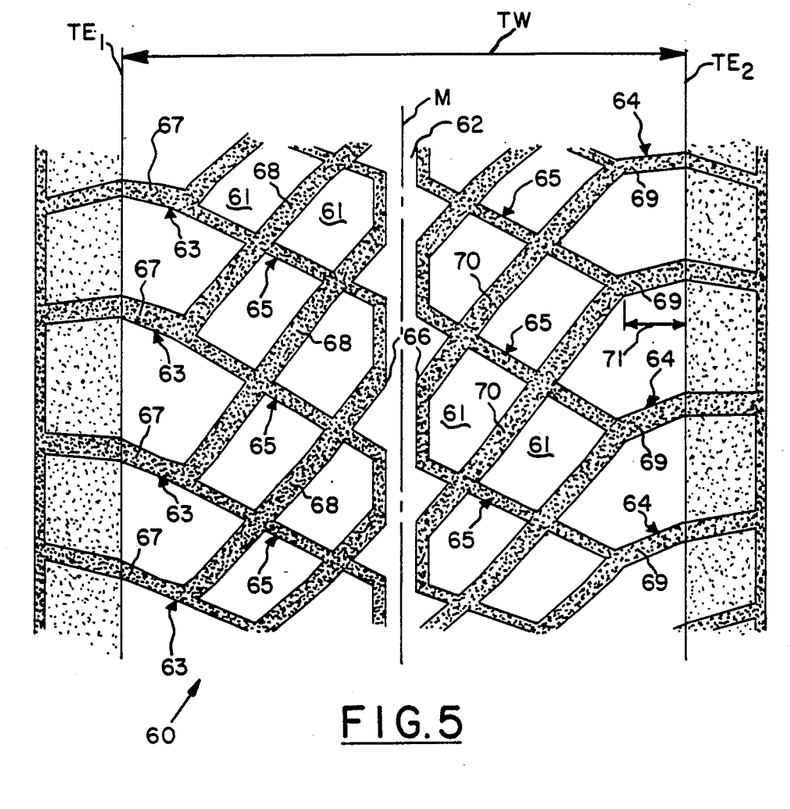
FIG. 5 is a fragmentary plan view of the tread portion of a pneumatic tire in accordance with an alternate embodiment of the present invention.

The axially outermost section 67 of each groove 63 of the first set of primary grooves, and the axially outermost section 69 of each groove 64 of the second set of primary grooves extend axially inwardly from the respective axial edge $TE_1$, $TE_2$ of the tread an axial distance in the range of 8% to 25% of the tread width TW, preferably between 10% and 14% of the tread width, as measured for example at 71 in FIG. 5.

Each secondary groove 65 has a width such that the secondary grooves remain open in a footprint of the tire. A secondary groove extends generally axially outwardly from the axially inner end 66 of each of the primary grooves 63, 64 and intersects a plurality, preferably four, primary grooves, but does not intersect an axial edge $TE_1$, $TE_2$ of the tread. The secondary grooves are oriented at an angle of 40° to 80°, preferably 45° to 75°, with respect to the mid-circumferential plane M of the tire.

If the axially outermost sections 67, 69 of the primary grooves were to be projected axially inwardly they would intersect and form a series of V's pointing in one circumferential direction of the tire. That is to say, the axially outer lateral edge portions of a tire tread according to the invention have grooves therein like a directional tread design.

However; if the other sections 68, 70 of the primary grooves are projected axially inwardly they will not intersect in a V. That is to say, the central portion of a tire tread according to the invention has grooves therein like a non-directional tread design. This feature of the invention can be made very clear by referring to FIGS. 6 to 10, all of which are fragmentary plan views of tire treads.

Figure 6:
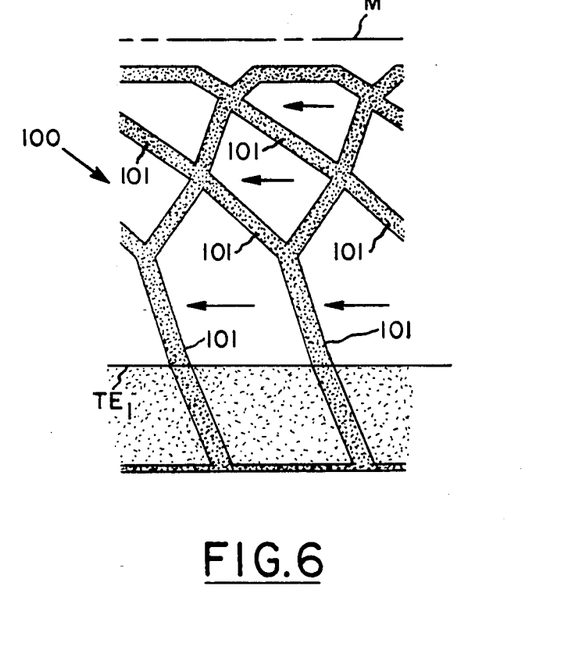
FIGS. 6-10 are fragmentary plan views of tire treads used for illustrating a specific aspect of the present invention.
Figure 7:
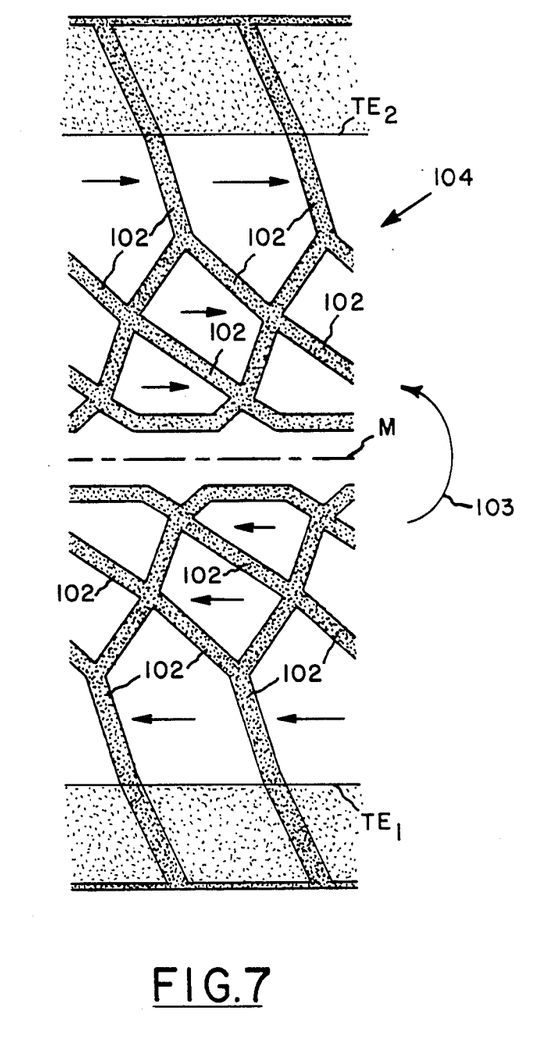

FIG. 6 illustrates the portion of a tire tread 100 located on one side of the mid-circumferential plane M of a tire. The grooves 101 in the tread are arranged such that for most efficient operation the part of the tread located between the tread edge TE, and the mid-circumferential plane M would be rotated in the direction indicated by the arrows in FIG. 6. In most prior art tread structures the design for one-half of the tread, as illustrated in FIG. 6 is "turned around" in the direction indicated by arrow 103 of FIG. 7 to produce a tread 104 such that between each tread edge $TE_1$,$TE_2$ and the mid-circumferential plane M the main grooves 102 are inclined such that the tread would preferably be operated in opposite directions, as indicated by the arrows. Of course, since the tread is a one piece structure this is not possible, so that most of the treads known in the prior art can be operated equally as efficient when rotated around the tire's axis in either direction. A tire tread of the type shown in FIG. 6 is a non-directional tread design.

Figure 8:
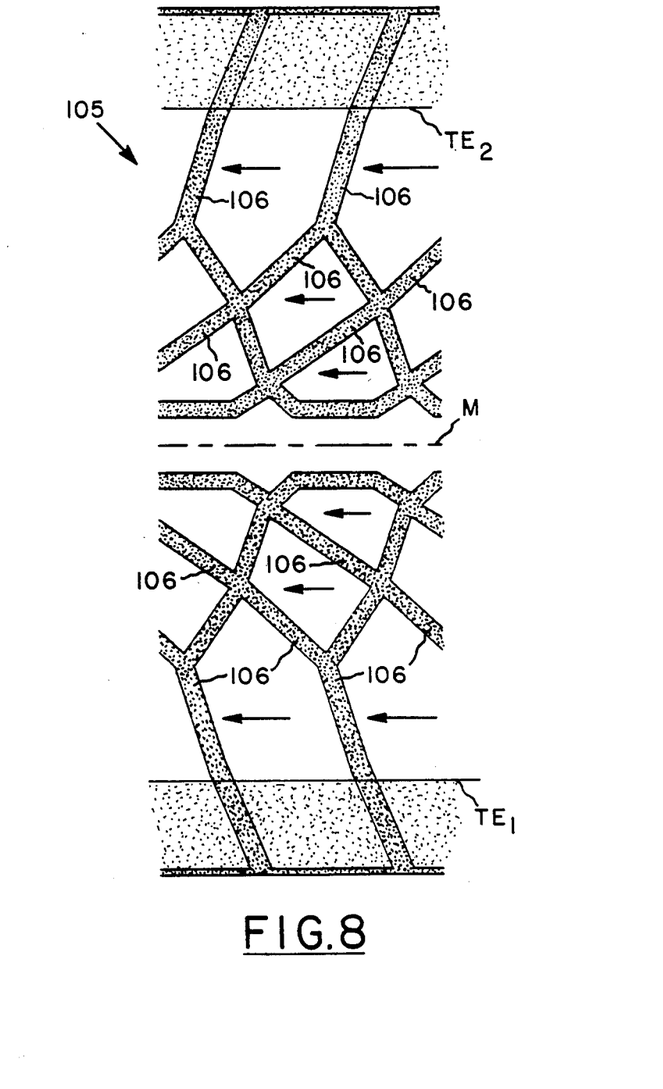

Referring next to FIG. 8 there is shown a tire tread 105 having a directional type of tread design in which all of the main grooves 106 are inclined in the same circumferential direction along their entire lengths, so that the tire can be operated most efficiently when it is rotated in the direction indicated by the arrows. This type of a tread design is made by flipping the design shown in FIG. 6 directly across the mid-circumferential plane.

Figure 9:
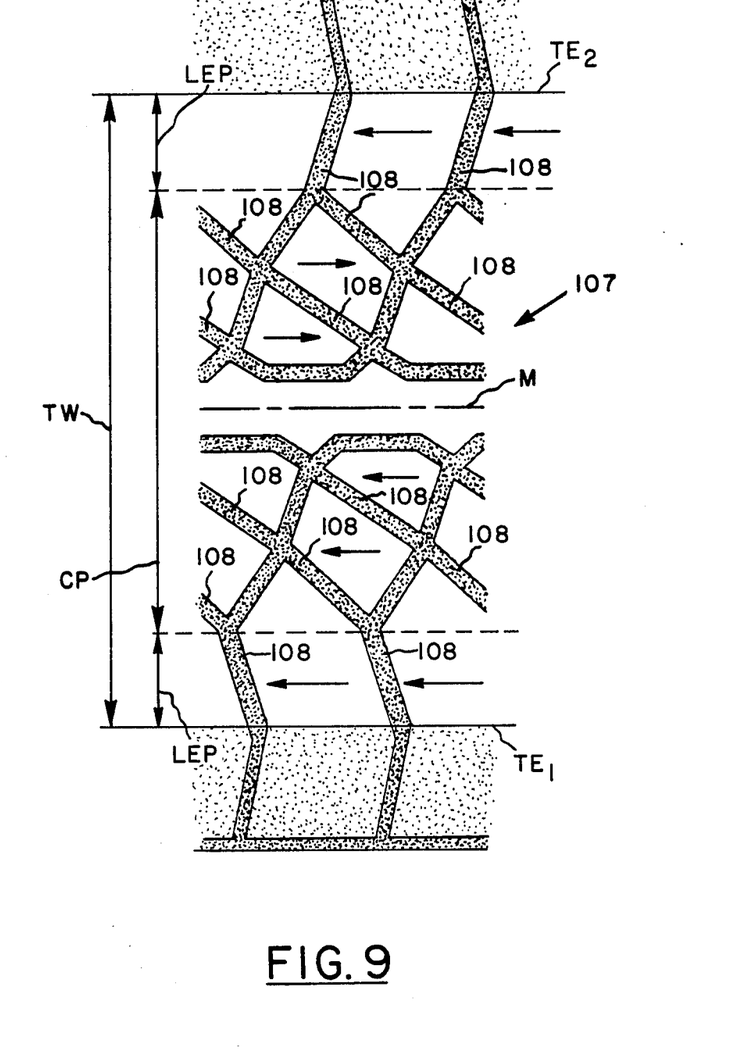

A tire according to the present invention is illustrated in FIG. 9, which shows a tread identical to that illustrated in FIG. 5, which has already been described herein. This tread 107 is divided into three axial zones. It has two lateral end portions LEP and a central portion CP. In each of the lateral end portions LEP the main grooves 108 are inclined in such directions that that portion of the tread would operate most efficiently if the tire were rotated in the direction indicated by the arrows in the lateral edge portions LEP. However; in the central portion CP of the tread, the main grooves 108 on one side of the mid-circumferential plane M would operate best if the tire were rotated in one direction, and the main grooves on the other side of the mid-circumferential plane would operate best if the tire were rotated in the opposite direction. In other words, the central portion CP of the tread has a non-directional design while the lateral edge portions LEP cooperate to have a directional design. Preferably the lateral edge portions LEP each extend axially inwardly from a respective lateral edge of the tread $TE_1$, $TE_2$ in the range of 8% to 25% of the tread width TW, and more preferably for a distance in the range of 10% to 14% of the tread width.

Figure 10:
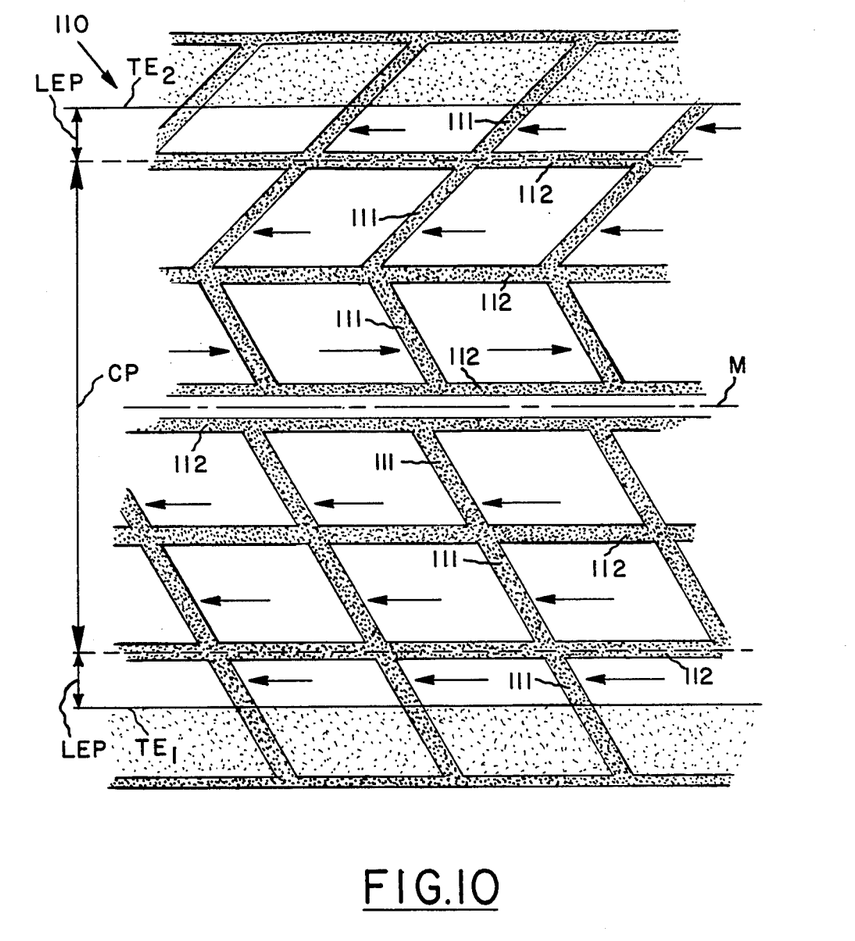

FIG. 10 illustrates a very simple embodiment of a tread portion 110 according to the present invention. The tread portion has main grooves 111 extending generally axially inwardly from the tread edges $TE_1$, $TE_2$ towards the mid-circumferential plane M of the tire.

Connecting grooves 112 extend between the main grooves. It is very clear in this embodiment that in the lateral edge portions LEP of the tread, each of which is adjacent to a tread edge, the main grooves would operate most efficiently if the tire is rotated in the direction indicated by the arrows in the lateral edge portions. However; in the central portion CP which is disposed axially between the lateral edge portions, the tread has a non-directional design, as indicated by the arrows in the central portion.

While the examples shown in FIGS. 9 and 10 for explanatory purposes, and all of the other embodiments disclosed herein comprise both main grooves that communicate with the tread edges and secondary grooves that do not communicate with the tread edges, the present invention in its broadest aspect also applies to a tire tread that has only main grooves that communicate with the tread edges, even if the tread has no other grooves or narrow slits therein, or even a tread having raised traction lugs having the general configuration of the main grooves 111 of FIG. 10.

It is apparent that a tire in accordance with any of the embodiments of the present invention will exhibit at least some of the advantages of both directional and non-directional tread structures.

Referring once again to the preferred and most preferred embodiments shown in FIGS. 1 through 4, the shape of the independent projections 14 and the continuous rib 16 are defined by a number of zig-zag grooves in the tread portion. The system of grooves comprise a first set of primary zig-zag grooves 18, a second set of primary zig-zag grooves 19, and first and second sets of secondary zig-zag grooves 20. The irregular shapes of the independent projections gives the preferred and most preferred embodiments good all-season characteristics.

Each of the primary zig-zag grooves 18,19 comprises a series of straight segments communicating with next adjacent segments and oriented at angular relationships with the next adjacent segments. The segments have widths such that the primary zig-zag grooves remain open in a footprint of the tire. Each groove 18 of the first set of primary zig-zag grooves extends generally axially inwardly from a first axial edge $TE_1$ of the tread, but does not intersect the mid-circumferential plane M of the tire. Each groove 19 of the second set of primary zig-zag grooves extends generally axially inwardly from a second axial edge $TE_2$ of the tread, but does not intersect the mid-circumferential plane M of the tire. Preferably the circumferential spacing between primary zig-zag grooves at the respective axial edge $TE_1$, $TE_2$ of the tread is in the range of 20 to 40 mm, or put another way about 20 to 40% of the tread width TW.

Each primary zig-zag groove 18, 19 has an axially inner end 22 that is located an axial distance of not more than 15% of the tread width TW away from the mid-circumferential plane M of the tire. Preferably the axially inner end of each primary zig-zag groove is located an axial distance of between 3% to 12% of the tread width away from the mid-circumferential plane of the tire. Every other segment 24 of each primary zig-zag groove 18, 19 is oriented at between 0° and 5° with respect to the mid-circumferential plane M, preferably at 0°. The remaining segments 26 of each primary zig-zag groove 18, 19 are oriented at angles of greater than 0° but not greater than 90° with respect to the mid-circumferential plane, with the angular orientation of said remaining segments with respect to the mid-circumferential plane progressively decreasing as the axial distance between said remaining segments and said mid-circumferential plane decreases.

The axially outermost segment 21 of each of the grooves 18 of the first set of primary zig-zag grooves extends axially inwardly from the first axial edge $TE_1$ of the tread in one generally circumferential direction of the tire at an angle in the range of 50° to 80°, preferably 70° to 80°, with respect to the mid-circumferential plane M. The remainder of the segments 24 and 26 of each of the grooves 18 of the first set of primary zig-zag grooves extend from the axially inner end of said axially outermost segment 21 to the axially inner end 22 of the primary zig-zag groove in an opposite generally circumferential direction of the tire at a nominal angle in the range of 10° to 30°, preferably 12° to 25°, with respect to the mid-circumferential plane M.

Each groove 19 of said second set of primary zig-zag grooves extends from the second axial edge $TE_2$ of the tread to the axially inner end 22 of the groove in only one generally circumferential direction along its entire length. The grooves 19 of the second set of primary zig-zag grooves extend from the second axial edge $TE_2$ of the tread towards the mid-circumferential plane M at a nominal angle in the range of 10° to 30°, preferably 12° to 25°, with respect to the mid-circumferential plane.

The axially outermost segment 21 of each groove 18 of the first set of primary zig-zag grooves, and the axially outermost segment 23 of each groove 19 of the second set of primary zig-zag grooves extend axially inwardly from the respective axial edge $TE_1$, $TE_2$ of the tread an axial distance in the range of 8% to 25% of the tread width TW, preferably between 10% and 14% of the tread width, as measured for example at 25 in FIG. 3.

Each secondary zig-zag groove 20 comprises a series of straight segments communicating with next adjacent segments and oriented at angular relationships with adjacent segments. The segments have widths such that the secondary zig-zag grooves remain open in a footprint of the tire. Each groove of a first set of secondary zig-zag grooves has an axially innermost segment 28 that intersects the axially innermost segment 30 of one of the grooves of said first set of primary zig-zag grooves. Each groove of said second set of secondary zig-zag grooves has an axially innermost segment 32 that intersects the axially innermost segment 34 of one of the grooves of said second set of primary zig-zag grooves. Each secondary zig-zag groove extends generally axially outwardly from its axially innermost segment and intersects a plurality, preferably four, primary zig-zag grooves, but does not intersect an axial edge of the tread. Portions of at least two segments of each secondary zig-zag groove are located between each pair of circumferentially next adjacent primary zig-zag grooves that a secondary zig-zag groove intersects. The secondary zig-zag grooves are oriented at a nominal angle of 40° to 80°, preferably 45° to 75°, with respect to the mid-circumferential plane of the tire.

The zig-zag configuration of the grooves provides a tire that has good traction on wet or snow covered surfaces, along with good wet skid characteristics. The varying angular orientation of said remaining segments of the primary zig-zag grooves, as a function of the distance of said remaining segments from the mid-circumferential plane provides noise levels that are very acceptable by increasing the stiffness of the leading edges of the independent projections as they enter the footprint of the tire and minimizing impact noise.

As shown in FIGS. 1, 2 and 3, it is preferred that the first and second sets of primary zig-zag grooves be separated from one another by a continuous rib 16 extending circumferentially about the tread portion and containing the mid-circumferential plane 16. This center rib embodiment of the invention is the most preferred embodiment because it aids in noise abatement and improves the performance of the tire under a variety of operating conditions. However, as illustrated in FIG. 4, in a tire tread portion 40, according to an alternative preferred embodiment, the axially inner segment 50 of each grove of the first set of primary zig-zag grooves communicates with the axially innermost segment 52 of a groove of the second set of primary zig-zag grooves by means of a connecting groove 54. In all other respects the tire tread portion 40 of the alternative preferred embodiment shown in FIG. 4 is substantially the same as that of the most preferred embodiment shown in FIGS. 1, 2 and 3.

In order to obtain the most efficient evacuation of water, mud or snow from the footprint of a tire according to the invention, the tread portion should have a net to gross ratio in the range of 60% to 80%, preferably 65% to 75%. Net to gross ratio is understood to mean the ratio between the area of a tread portion in a tire footprint that is in actual contact with the ground and the total gross area of the tire footprint.

Referring once again to FIGS. 1, 2 and 3, it may be observed that the tread portion of a tire according to any of the embodiments of the invention may have a plurality of narrow slits 36 therein. These narrow slits are sometimes referred to as blades or sipes, and have a width such that the narrow slits are closed in a footprint of the tire. Each narrow slit 36 intersects the vertex of a projecting angle of one of the primary zig-zag grooves. The narrow slits extend in either axially or generally axially directions, but do not extend across the entire width of an independent projection or rib. The narrow slits may be incorporated in a tread portion to provide some flexibility to the independent projections and/or the center rib, while the zig-zag grooves make the leading edges of the independent projections still for noise abatement and traction purposes.

While certain representative embodiments and details have been shown for the purpose of illustrating the invention, it will be apparent to those skilled in the art that various changes and modifications may be made therein without departing from the invention.

What is claimed:

1. A pneumatic tire comprising a tread portion having independent projections defined by:
   (a) first and second primary grooves, each circumferentially spaced apart primary grooves, each primary groove comprising two sections oriented at angular relationships with respect to each other, said sections having widths such that the primary grooves remain open in a footprint of the tire, each groove of said first set of primary grooves extending generally axially inwardly from a first axial edge of the tread but not intersecting a mid-circumferential plane of the tire, each groove of said second set of primary grooves extending generally axially inwardly from a second axial edge of the tread but not intersecting the mid-circumferential plane of the tire, each primary groove having an axially inner end that is located an axial distance of not more than 15% of the tread width away from the mid-circumferential plane of the tire, an axially outermost section of each of the grooves of said first set of primary grooves extending axially inwardly from the first axial edge of the tread in one generally circumferential direction and the second section of each of the grooves of said first set of primary grooves extending from an axially inner end of said axially outermost section to an axially inner end of the groove in an opposite generally circumferential direction, an axially outermost section of each of the grooves of said second set of primary grooves extending axially inwardly from the second axial edge of the tread in a generally circumferential direction such that if the axially outermost sections of the grooves of said first and second sets of primary grooves are projected axially inwardly they will intersect and form a series of V's which all point in one circumferential direction of the tire, and the second section of each of the grooves of said second set of primary grooves extending from an axially inner end of said axially outermost section to the axially inner end of the groove in the same generally circumferential direction as said axially outermost section of the same groove such that if the second sections of the grooves of said first and second sets of primary grooves are projected axially inwardly they will not intersect to form V's; and
   (b) first and second sets of circumferentially spaced apart secondary grooves, said secondary grooves having widths such that the secondary grooves remain open in a footprint of the tire, a secondary groove extending generally axially outwardly from the axially inner end of each of the primary grooves and intersecting a plurality of primary grooves, but no secondary grooves intersect the axial edges of the tread.

2. A pneumatic tire according to claim 1 wherein the sections of said primary grooves are straight.

3. A pneumatic tire according to claim 1 wherein the sections of said primary grooves are curvilinear.

4. A pneumatic tire according to claim 1 wherein the second sections of said primary grooves comprise a plurality of segments arranged in a zig-zag configuration.

5. A pneumatic tire comprising a tread portion having independent projections defined by:
   (a) first and second sets of circumferentially spaced apart primary zig-zag grooves, each primary zig-zag groove comprising a series of straight segments communicating with next adjacent segments and oriented at angular relationships with next adjacent segments, said segments having widths such that the primary zig-zag grooves remain open in a footprint of the tire, each groove of said first set of primary zig-zag grooves extending generally axially inwardly from a first axial edge of the tread but not intersecting a mid-circumferential plane of the tire, each groove of said second set of primary zig-zag grooves extending generally axially inwardly from a second axial edge of the tread but not intersecting the mid-circumferential plane of the tire, each primary zig-zag groove having an axially inner end that is located an axial distance of not more than 15% of the tread width away from the mid-circumferential plane of the tire, an axially outermost segment of each of the grooves of said first set of primary zig-zag grooves extending axially inwardly from the first axial edge of the tread in one generally circumferential direction and the remaining segments of each of said grooves of said first set of primary zig-zag grooves extending from an axially inner end of said axially outermost segment to an axially inner end of the groove in an opposite generally circumferental direction, an axially outermost segment of each groove of said second set of primary zig-zag grooves extending from the second axial edge of the tread in a generally circumferential direction such that if the axially outermost segments of the zig-zag grooves of said first and second sets of primary zig-zag grooves are projected axially inwardly they will intersect and form a series of V's which all point in one circumferential direction of the tire, and the remaining segments of each of said grooves of said second set of primary zig-zag grooves extending from an axially inner end of said axially outermost segment to the axially inner end of the groove in the same generally circumferential direction as said axially outermost segment of the same groove such that if said paths followed by said remaining segments of said first and second sets of primary zig-zag grooves are projected axially inwardly they will not intersect to form V's, every other segment of each primary zig-zag groove being oriented at between 0° and 5° with respect to said mid-circumferential plane and the remaining segments of each primary zig-zag groove being oriented at angles of greater than 0° but no greater than 90° with respect to said mid-circumferential plane, the angular orientation of said remaining segments with respect to said mid-circumferential plane progressively decreasing as the axial distance between said remaining segments and said mid-circumferential plane decreases; and (b) first and second sets of circumferentially spaced apart secondary zig-zag grooves, each secondary zig-zag groove comprising a series of straight segments communicating with next adjacent segments and oriented at angular relationships with adjacent segments, said segments having widths such that the secondary zig-zag grooves remain open in a footprint of the tire, each groove of said first set of secondary zig-zag grooves having an axially innermost segment that intersects the axially innermost segment of one of the grooves of said first set of primary zig-zag grooves, each groove of said second set of secondary zig-zag grooves having an axially innermost segment that intersects the axially innermost segment of one of the grooves of said second set of primary zig-zag grooves, each secondary zig-zag groove extending generally axially outwardly from its axially innermost segment and intersecting a plurality of primary zig-zag grooves but not intersecting an axial edge of said tread, and portions of at least two segments of each secondary zig-zag groove being located between each pair of circumferentially next adjacent primary zig-zag grooves that the secondary zig-zag groove intersects.

6. A pneumatic tire according to claim 5 wherein each of said every other segments of each primary zig-zag groove is oriented at 0° with respect to said mid-circumferential plane.

7. A pneumatic tire according to claim 5 wherein each secondary zig-zag groove intersects four primary zig-zag grooves.

8. A pneumatic tire according to claim 5 wherein each secondary zig-zag groove intersects four primary zig-zag grooves, and each of said every other segments of each primary zig-zag grooves is oriented at 0° with respect to said mid-circumferential plane.

9. A pneumatic tire according to any one of claims 5,6 or 7 wherein said first and second sets of primary zig-zag grooves are separated from one another by a continuous rib extending circumferentially about the tread portion and containing said mid-circumferential plane.

10. A pneumatic tire according to any one of claims 7,8 or 9 wherein the axially innermost segment of each groove of said first set of primary zig-zag grooves communicates with the axially innermost segment of a groove of said second set of primary zig-zag grooves by means of a connecting groove.

11. A pneumatic tire according to claim 9 wherein said tread portion has a net to gross ratio in the range of 60% to 80%.

12. A pneumatic tire according to claim 10 wherein said tread portion has a net to gross ratio in the range of 60% to 80%.

13. A pneumatic tire according to claim 8 wherein said first and second sets of primary zig-zag grooves are separated from one another by a continuous rib extending circumferentially about the tread portion and containing said mid-circumferential plane.

14. A pneumatic tire according to any one of claims 5,6 or 7 wherein said tread portion has a plurality of narrow slits therein, each said narrow slit intersecting the vertex of a projecting angle of one of said primary zig-zag grooves, said narrow slits each having a width such that the slits are closed in a footprint of the tire.

15. A pneumatic tire according to claim 14 wherein said tread portion has a plurality of narrow slits therein, each said narrow slit intersecting the vertex of a projecting angle of one of said primary zig-zag grooves, said narrow slits each having a width such that the slits are closed in a footprint of the tire.

16. A pneumatic tire according to claim 15 wherein said tread portion has a net to gross ratio in the range of 60% to 80%.

* * * * *